UNITED STATES PATENT OFFICE.

SAMUEL CLELAND DAVIDSON, OF BELFAST, IRELAND.

MANUFACTURE OF RUBBER.

1,380,640. Specification of Letters Patent. Patented June 7, 1921.

No Drawing. Application filed February 24, 1920. Serial No. 360,834.

*To all whom it may concern:*

Be it known that I, SAMUEL CLELAND DAVIDSON, a subject of the King of Great Britain and Ireland, of Belfast, Ireland, merchant, have invented certain new and useful Improvements in the Manufacture of Rubber, of which the following is a specification.

This invention relates to a new industrial and complete process for rapidly manufacturing a high class quality of what is commercially known as raw rubber directly from the fluid latex, by the application thereto in successive order of a series of heretofore disjointed or independent detail treatments, whereby the operative effects resulting from each of these treatments form a conjoined series of progressive steps, the combination of which constitutes a complete and continuous process, which can be satisfactorily operated on a commercial scale either at the plantations, or after transmission of the latex to America, Europe, or elsewhere, and wherein the hitherto ordinarily employed and tedious operations of evaporative drying, or of smoking, are eliminated.

In operating my herein described invention, the latex is firstly treated, as soon as practicable after it has been tapped from the rubber trees, with a preservative mixture in the form of a very dilute aqueous solution of alkalized phenol (whether said phenol be of the creosote, carbolic or cresylic series) substantially as described in previous Letters Patent granted to me, and numbered 1,145,352 and 1,146,851 which treatment insures the latex keeping in a fluid state for any required length of time, and in as sound condition for subsequent coagulation and manufacture into raw rubber as when freshly tapped.

The second treatment is the coagulation of the rubber from the already preservatively treated latex, by adding thereto a dilute solution of a suitable acid, acetic or sulfuric acid, for example, in sufficient quantity to neutralize the alkalinity of said preservative treatment, and acidify the latex, whereby nascent phenol is liberated, and a rapid and complete coagulation of the contained rubber takes place, while, at the same time, the bulk of the impurities originally contained in the latex remains in solution in the mother liquor.

The third step in the series of treatments consists in subjecting the coagulum to a suitable mechanical dehydrating treatment adapted to disperse any bubbles formed therein, and also to expel much of the moisture contained in the coagulum itself, after which, if the coagulum be wanted in a more pliable condition, it may be dipped for a short time in hot or boiling water, rolled out into thin sheets or crape, which can then be rolled up into round bars, and kneaded until the sheets or crape become welded together into solid bars, as hereinafter more particularly described, or pressed into blocks, or other preferred form, whereby the bulk of the mother liquor and dissolved impurities still remaining in the coagulum are sufficiently expelled therefrom, without any requirement for evaporative drying, or other treatment, to, at this stage, and owing to the excellent keeping qualities which the rubber possesses, permit of its being packed and despatched to the market, or for its subsequent further treatment, prior to vulcanization.

For the already referred to coagulation treatment of the latex any suitable acid and method of applying same may be used, and this treatment may conveniently be applied by means of the apparatus described in my Patent No. 1,189,351.

With this apparatus, the latex is put into the cradle-like receptacle thereof, and the coagulating fluid is gradually added thereto through a tap from a tank above the center of the cradle, while the latter is given a to and fro rocking motion, if desired, for a short time after the coagulation is completed. For further particulars of the manner in which this treatment is carried out, and of the construction and operation of the apparatus, the specification of my said prior patent may be consulted. The mechanical agitation and mixing thus imparted to the latex while the coagulating fluid is gradually added to it, is of material benefit toward obtaining a good separation of the coagulum from the mother liquor, which latter, in combination with the dissolved impurities therein, churns up into a condition somewhat resembling soap suds.

After the completion of the coagulating treatment, the coagulum is then as already stated subjected to any suitable form of mechanical dehydrating treatment, and for this purpose I preferably use the new dehydrating apparatus designed by me and described in my co-pending application, Serial No.

358,441 which apparatus has been found highly effective in practical operation.

In operating this dehydrating apparatus, the coagulated rubber is spread in as even a layer as practicable inside a shallow carrying frame, and the layer is then perforated from top to bottom with numerous fine perforations, by means of a group or series of pins, (such, for example, as hackle pins) spaced at suitable distances apart, and mounted firmly at their thick ends in a horizontal but vertically movable plate, with their sharp pointed ends projecting into, and, when operating, passing through guide holes in a horizontally fixed stripping plate, which is so mounted that the carrying frame can freely slide under it when the pins are not projecting through. When the contained rubber is in suitable position, the pin plate is pressed down until the pointed ends of the pins pass completely, or almost completely, through the layer of rubber, and is then drawn up again, whereupon the rubber itself clings to the pins until it comes in contact with the fixed stripping plate, whereby the rubber is cleanly stripped off the pins, and left within the carrying frame as a slack fitting layer of considerably reduced thickness and of somewhat mat-like form. The perforations thus made in it act as drainage tubes through which, owing to the contracting tendency possessed by the rubber itself, the greater part of the air, gas or water is expelled from the main body of the rubber, as well as from within such bubbles as have thus been perforated.

The carrying frame may then be drawn out, and the perforated layer of rubber turned half-way around either to right or left, and replaced in the frame, which is again pushed into position below the pin plate and the rubber perforated a second time, whereby, owing to the suitable spacing apart of the pins from one another, the perforations now made will be to such extent out of register with those previously made, that they will be approximately intermediate between the first ones, so that the total number of same will thus be doubled. This perforating operation may, if considered desirable, be repeated several times.

The layer of rubber can now be turned right over, so that its under surface will be uppermost, and then by further perforating it two or more times, as already described, both sides will thus be similarly perforated, and the layer of rubber further reduced in thickness, due to the further exudation of fluid therefrom.

The rubber is then removed from the carrying frame of the dehydrator and may, if it be wanted in a more pliable condition, be dipped for a few minutes in hot or boiling water, and then passed through any suitable form of mangle rollers rotating at substantially equal speed, and with a lesser clearance space between them than the thickness of the layer of rubber each time it is passed through, whereby it is gradually rolled out into a thin sheet, during which treatment a further exudation of fluid from it takes place. In this sheet form it only requires the surface water to be removed in any convenient way for it to be considered as marketable raw rubber, but I preferably subject it to a further treatment, which consists in rolling one or more of the sheets up into a bar-like form, which is then passed into an apparatus of preferably the type described and shown in my Patent No. 1,287,253, and therein rolled tightly upon itself and under gradually increasing pressure, whereby the successive layers of the roll become so welded together that a solid round bar is thus formed, the exposed surface area of which is relatively so small as to be negligible, while its interior is practically impervious to any detrimental atmospheric effects. The rubber is now ready for packing and shipment, or for its subsequent treatment prior to vulcanization.

The rollers employed in any of the above described operations should, in order to obtain the best results, be maintained in a moderately heated condition, and preferably by having a supply of hot water trickling over them while operating, and which also has a beneficial washing effect on the exposed surfaces of the rubber.

Raw rubber produced directly from latex preserved as hereinbefore referred to and treated in accordance with the herein described process, and with the complete elimination of the heretofore usually employed smoking or evaporative drying process, can be brought to a marketable condition in less than one hour, whereas according to the hitherto ordinary method of manufacture now generally prevailing at the eastern rubber plantations, it frequently takes a couple of weeks or more to get the raw rubber ready for packing, because, in order to insure its keeping in good condition, almost complete evaporative drying is essential, which is a very tedious process involving much careful attention, owing to its being necessarily a continuous operation during both day and night.

What I claim and desire to secure by Letters Patent is:—

1. A process for preparing raw rubber of high grade directly from rubber latex in a simplified manner and with the omission of evaporative drying or smoking which consists in the combination of several consecutive and, when so employed, conjointly operative treatments, as follows: first, treating the latex, as soon as practicable after being tapped from the rubber trees, with a dilute aqueous solution of alkalized phenol to preserve the latex in a fluid and sound condition for any required length of time prior to coagulation; second, adding thereto a dilute solution of a suitable acid in sufficient quantity to neutralize the alkalinity of said preservative treatment and acidify the latex, whereby nascent phenol is liberated and energetic coagulation of the contained rubber in the latex takes place, the bulk of the impurities originally contained in the latex remaining in solution in mother liquor; and third, subjecting the coagulum of rubber thus obtained to a mechanical dehydrating treatment, all substantially as hereinbefore described.

2. Raw rubber produced according to the process defined in claim 1.

In witness whereof I have hereunto signed my name in the presence of two subscribing witnesses.

SAMUEL CLELAND DAVIDSON.

Witnesses:
ALFRED AGAR,
ALEXANDER BROWN.